Patented Oct. 31, 1950

2,527,574

UNITED STATES PATENT OFFICE 2,527,574

ESTERS OF PHENYL-HETEROCYCLICAMINO-ACETIC ACID AND THEIR PRODUCTION

George Rieveschl, Jr., Grosse Pointe Woods, Mich., assignor to Parke, Davis & Company, Detroit, Mich., a corporation of Michigan No Drawing. Application June 1, 1948, Serial No. 30,500

9 Claims. (Cl. 260—294.3)

This invention relates to phenyl aminoacetic acid esters and their acid addition salts and to methods for obtaining the same. More particularly, the invention relates to phenyl heterocyclic aminoacetic acid esters having, in the free base form, the following formula,

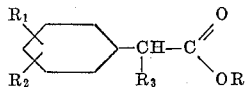

where R is a lower alkyl or aralkyl radical, $R_1$ and $R_2$ are the same or different and represent hydrogen, halogen, alkyl or alkoxy radicals and $R_3$ is a residue of an aliphatic or hydroaromatic heterocyclic nitrogen compound which is bound to the aliphatic carbon of the phenyl acetic acid portion of the ester through a secondary ring nitrogen atom.

In accordance with the invention phenyl aminoacetic acid esters of the above general formula are prepared by either a one-step process from a phenyl haloacetic acid ester or by a multi-step, unit process from a phenyl acetyl halide or phenyl haloacetyl halide. The one-step process which also comprises the last step of the two unit processes is carried out by reacting a phenyl haloacetic acid ester with at least two mols of a heterocyclic compound containing a secondary ring nitrogen atom in the presence or absence of an inert, neutral organic solvent such as a liquid hydrocarbon, a halogenated aliphatic hydrocarbon, a lower aliphatic alcohol, a lower aliphatic ether, a lower aliphatic ketone, a lower aliphatic ester, a cycloaliphatic ether, an aliphatic glycol and the like. Due to the reactivity of the halogen atom of the phenyl haloacetic acid ester the temperature used for the reaction may be varied over a rather wide range. In general, a temperature between about 10 and 150° C. may be employed although in most cases a temperature between about 40 and 90° C. is preferred.

In the unit process for obtaining the phenyl aminoacetic acid esters from a phenyl acetyl halide, the acyl halide is halogenated on the aliphatic carbon atom thereof with elemental halogen, the resulting phenyl haloacetyl halide reacted with a lower aliphatic or araliphatic alcohol to produce hydrogen halide and a phenyl haloacetic acid ester, the hydrogen halide removed from the ester and the phenyl haloacetic acid ester reacted, as described above, with a heterocyclic compound containing a secondary ring nitrogen atom. Alternatively, phenyl haloacetyl halides can be used as the starting materials in a modification of the unit process. In this case the first step, that is, the halogenation of the phenyl acetyl halide, of the previously described unit process is omitted and the remainder of the process carried out as described above.

The transformations which take place in these processes can be diagrammatically represented as follows:

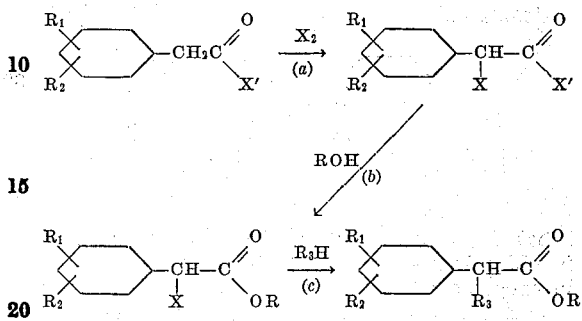

where steps $a$, $b$ and $c$ represent the unit process, steps $b$ and $c$ the modified unit process and step $c$ the one-step process. R, $R_1$, $R_2$ and $R_3$ in the above formulae have the same significance as given previously and X and X' are the same or different and represent chlorine or bromine atoms.

The transformation represented by step (a) in the above diagrammed unit process is carried out in the conventional manner for the halogenation of acyl halides with elemental halogen. In general, the halogenation is carried out in the presence of light and the halogen added slowly to the phenyl acyl halide with heating. Although it is not necessary, an inert organic solvent such as carbon tetrachloride may be employed.

Step (b) of the unit processes, the esterification of the alcohol with the phenyl haloacetyl halide, is carried out in the usual manner for the esterification of alcohols with acyl halides. In the unit process the crude reaction mixture containing the phenyl haloacetyl halide is used as the starting material either before or after the removal of the hydrogen halide formed during the halogenation reaction while in the modified unit process a purified phenyl haloacetyl halide is used as the starting material. In bringing about the reaction the phenyl haloacetyl halide is added slowly to the lower aliphatic or araliphatic alcohol to be esterified either in the presence or absence of an inert organic diluent such as ether, dioxane, petroleum, ether, benzene, toluene, xylene and the like. After the addition has been completed and the spontaneous reaction has ceased, external heat may be applied to complete the reaction although this is usually only necessary in the case of the less reactive alcohols.

Step (c) of the unit processes is carried out as described above after removal of the hydrogen halide from the phenyl haloacetic acid ester by distillation, washing, neutralization or by other suitable means. Some examples of the aliphatic or araliphatic heterocyclic compounds containing a secondary ring nitrogen atom which can be used as the second reactant in this step of the processes are: Pyrrolidine, piperidine, morpholine, thiomorpholine, tetrahydroquinoline and lower alkyl carbon - substituted derivatives thereof.

The phenyl amino acetic acid esters of the invention are basic in nature and form acid addition salts with inorganic and organic acids such as hydrochloric, hydrobromic, hydriodic, sulfuric, sulfamic, tartaric, oxalic, benzoic, citric, picric, acetic and the like acids. These acid addition salts as well as the free bases of the amino esters are relatively non-toxic and find particular use as analgetics or products for the relief of pain.

The invention is illustrated by the following examples.

*Example 1.—Ethyl phenyl piperidinoacetate*

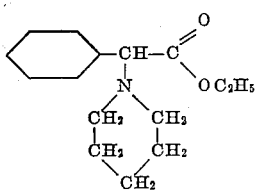

(a) 13 cc. of piperidine in 27 cc. of isopropanol is added to a solution of 12.15 g. of ethyl phenyl bromoacetate in 40 cc. of isopropanol. After the reaction mixture has cooled, the isopropanol is removed by distillation and the residue treated with a mixture composed of 200 cc. of water and 200 cc. of ether. The organic layer is removed, washed with water and dried. After removal of the drying agent by filtration the free base of ethyl phenyl piperidinoacetate in the filtrate is converted to its hydrochloride salt by the addition of an excess of alcoholic hydrogen chloride. The solvent is decanted from the gummy hydrochloride, the residue taken up in hot isopropanol and dry ether added. The hydrochloride salt which crystallizes on cooling is collected and recrystallized from isopropanol-ether mixture; M. P. 175–6° C.

(b) Ethyl phenyl piperidinoacetate and its hydrochloride salt can also be prepared by a unit process using phenylacetyl chloride as a starting material. This unit process is carried out as follows:

83 g. of bromine is added to 250 g. of phenylacetyl chloride heated at 130 to 150° C. in the presence of light. After all the bromine has been added to the mixture heating is continued for one and a half hours and then the mixture allowed to stand overnight while a stream of air is bubbled through the liquid to remove hydrogen bromide and any excess bromine. The residue which consists of phenyl bromoacetyl chloride is taken up in 200 cc. of carbon tetrachloride and 82 g. of ethanol added to the solution over a period of one and a half hours. After the vigorous reaction has ceased and the mixture has cooled, the reaction mixture is stirred for one hour and then the solvents evaporated in vacuo.

320 cc. of isopropanol is added to the residual ethyl phenyl bromo-acetate and 302.5 g. of piperidine added to the solution over a period of thirty minutes with cooling. The reaction mixture is heated on a steam bath for two hours, allowed to stand overnight and the piperidine hydrobromide removed by filtration. The piperidine hydrobromide is washed with ether and the washings combined with the main filtrate. The ether and isopropanol are removed from the solution by distillation in vacuo and the residue treated with 500 cc. of water and 500 cc. of ether. The organic layer is removed, washed with water and dried over potassium carbonate. The drying agent is removed by filtration and the desired ethyl phenyl piperidinoacetate precipiated from the filtrate as the hydrochloride salt by the addition of 350 cc. of alcoholic hydrogen chloride. Recrystallization from isopropanol-ether mixture yields the pure salt melting at 175–6° C.

Alternatively, the free base of ethyl phenyl piperidinoacetate can be isolated from the ether solution by evaporating off the ether and distilling the residue under vacuo; B. P. 159–61° C./6 mm.

*Example 2.—Methyl phenyl piperidinoacetate*

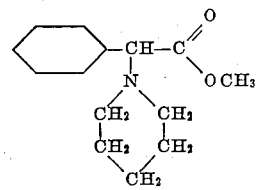

93.2 g. of phenyl bromoacetyl chloride is added slowly to 200 cc. of methanol over a period of one and one-half hours and the resulting mixture refluxed for one hour. The methanol is removed by distillation and the residue diluted with ether. The ether solution is washed with sodium bicarbonate solution, dried and the ether distilled. The residual methyl phenyl bromoacetate is diluted with 100 cc. of methanol and 68 g. of piperidene added slowly to the solution over a period of one-half hour. The methanol is removed by distillation, the residue diluted with water and extracted with ether. The ether extract is washed with water and the washings discarded. The ether extract is extracted with dilute hydrochloric acid, the aqueous extracts made alkaline and extracted with fresh ether. The ether extract is dried and treated with an excess of isopropanolic hydrogen chloride. The hydrochloride salt which separates is collected and recrystallized from a 1 to 2 mixture of isopropanol-ether; M. P. 171° C.

*Example 3.—n-Propyl phenyl piperidinoacetate*

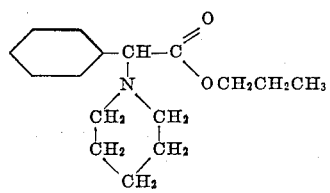

70 g. of phenyl bromoacetyl chloride is added slowly to 40 cc. of n-propyl alcohol over a period of one-half hour. After spontaneous refluxing ceases, the mixture is heated on a stem bath for one hour and then poured into 500 cc. of water. The mixture is extracted with 500 cc. of ether, the ether extract washed with water, dried and the ether distilled.

55 cc. of piperidine in a small amount of isopropanol is added to the residual n-propyl phenyl bromoacetate diluted with 77 cc. of isopropanol and the resulting mixture heated for about one hour on a steam bath. The isopropanol is removed by distillation in vacuo and the residue treated with about 500 cc. of water. The aqueous mixture is extracted with ether, the ether extracts dried and the ether distilled. Distillation of the residue under reduced pressure yields the desired n-propyl phenyl piperidinoacetate; B. P. 111–3° C./3 mm.

The hydroiodide salt can be prepared by the reaction of hydrogen iodide with the free base in isopropanol. After crystallization from isopropanol this salt melts at 153–5° C.

*Example 4.—Isopropyl phenyl piperidinoacetate*

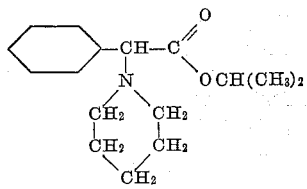

20 g. of piperidine is added slowly to 25.7 g. of isopropyl phenyl bromoacetate dissolved in 50 cc. of isopropanol. After the spontaneous reaction has ceased, the mixture is warmed on a steam bath for fifteen minutes and then cooled. Water is added and the mixture extracted with ether. The ether extract is washed with water, dried over potassium carbonate and the dry ether solution containing the free base of isopropyl phenyl piperidinoacetate treated with an excess of alcoholic hydrogen chloride. The hydrochloride salt of isopropyl phenyl piperidinoacetate which separates from the solution is collected and purified by recrystallization from isopropanol-ether mixture; M. P. 162–4° C.

*Example 5.—n-Butyl phenyl piperidinoacetate*

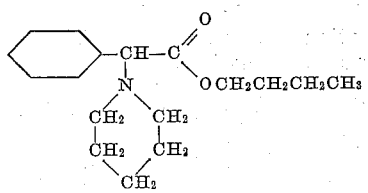

70 g. of phenyl bromoacetyl chloride is added to 30 cc. of n-butanol in 50 cc. of carbon tetrachloride at such a rate that the mixture just refluxes. The reaction mixture is allowed to stand overnight and the carbon tetrachloride and excess n-butanol removed by distillation in vacuo. The residual n-butyl phenyl bromoacetate is dissolved in 100 cc. of isopropanol and then treated with 27 g. of piperidine. The mixture is allowed to stand for about thirty minutes and then heated on a steam bath for about thirty minutes. After cooling, the reaction mixture is diluted with ether, filtered and the solvents removed from the filtrate by distillation. Distillation of the residue in vacuo yields the desired n-butyl phenyl piperidinoacetate; B. P. 137–8° C./1 mm.

*Example 6.—Isobutyl phenyl piperidinoacetate*

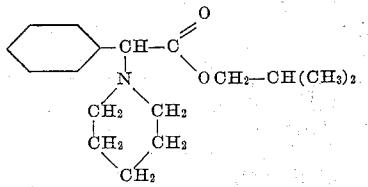

70 g. of phenyl bromoacetyl chloride is added slowly to 22 cc. of isobutyl alcohol in 50 cc. of carbon tetrachloride and the resulting mixture allowed to stand at room temperature for about one-half hour. The reaction mixture is heated on a water bath until the evolution of hydrogen chloride almost ceases, cooled and diluted with 50 cc. of isopropanol. 55 g. of piperidine is added slowing with stirring and the mixture allowed to stand overnight. The solvents are distilled in vacuo and 300 cc. of water added to the residue. The aqueous mixture is extracted with ether, the ether extract washed with water, dried and the ether distilled. The residue is distilled in vacuo to obtain the desired isobutyl phenyl piperidinoacetate boiling at 137–8° C. at 1 mm.

*Example 7.—Ethyl phenyl-(2-methyl-piperidino) acetate*

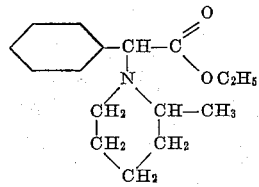

24.3 g. of ethyl phenyl bromoacetate in 100 cc. of benzene is added to a solution of 19.8 g. of 2-methylpiperidine in 50 cc. of benzene and the resulting mixture heated on a stream bath for thirty minutes. The mixture is cooled, filtered and the filtrate washed with water. The filtrate is dried, the benzene distilled and the residue distilled in vacuo to obtain the desired ethyl phenyl-(2-methylpiperidino)acetate; B. P. 164–6° C./9 mm.

*Example 8.—Ethyl phenyl morpholinoacetate*

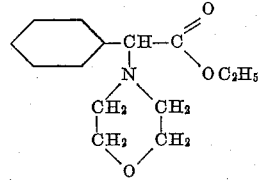

10 cc. of morpholine is added slowly to 12.15 g. of ethyl phenyl bromoacetate in 25 cc. of isopropanol and the mixture allowed to stand for one hour. The isopropanol is removed by distillation and 200 cc. of water added to the residue. The mixture is extracted with ether, the ether extract washed with water, dried and filtered. The filtrate is treated with an excess of alcoholic hydrogen chloride and the ether decanted from the gummy hydrochloride salt which separates. Recrystallization from isopropanol-ligroin yields the pure ethyl phenyl morpholinoacetate hydrochloride melting at 184–5° C.

*Example 9.—Ethyl phenyl tetrahydroquinolinoacetate*

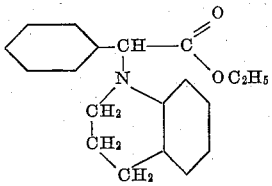

A mixture consisting of 24.3 g. of ethyl phenyl bromoacetate, 27 g. of tetrahydroquinoline, 10 cc. of isopropanol and 100 cc. of benzene is heated under reflux for about five hours and then the solvents removed by distillation in vacuo. The residue is diluted with ether and the tetrahydroquinoline hydrobromide which separates removed by filtration. The ether filtrate is washed with water, the washings discarded and then the ether solution extracted with dilute hydrochloric acid. The aqueous extracts are decolorized with charcoal, made alkaline with dilute sodium hydroxide solution and extracted with ether. The ether extract is treated with decolorizing charcoal, dried and the ether removed by distillation to obtain the desired ethyl phenyl tetrahydroquinolinoaceate as an oil.

*Example 10.—Isopropyl p-tolyl piperidinoacetate*

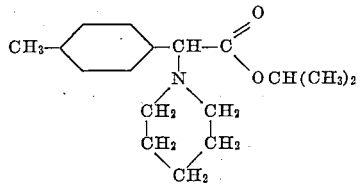

27 g. of isopropyl p-tolyl bromoacetate is added slowly to 20 cc. of piperidine in 75 cc. of isopropanol. After the spontaneous reaction ceases, the mixture is heated for one-half hour on a steam bath and then the isopropanol removed by distillation. 300 cc. of water is added to the residue and the mixture extracted with ether. The ether extract is washed with water, dried and the ether distilled. The residue is distilled under reduced pressure to obtain the desired isopropyl p-tolyl piperidinoacetate as an almost colorless oil.

*Example 11.—Ethyl o-anisyl-(2,6-dimethylpiperidino) acetate*

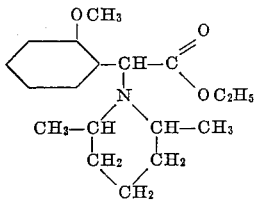

27.3 g. of ethyl o-anisyl bromoacetate is added slowly to 25 g. of 2,6-dimethylpiperidine dissolved in 75 cc. of isopropanol and the resulting mixture heated on a steam bath for about one hour. The isopropanol is removed by distillation and the residue treated with 350 cc. of water. The mixture is extracted with ether and the ether extract, after washing with water, extracted with dilute hydrochloric acid. The aqueous extract is decolorized with charcoal, made alkaline with sodium hydroxide solution and extracted with ether. The ether extract is treated with decolorizing charcoal, washed with water, dried and the ether distilled to obtain the desired ethyl o-anisyl-(2,6-dimethylpiperidino) acetate.

*Example 12.—n-Propyl m-chlorophenyl-(3-methypiperidino) acetate*

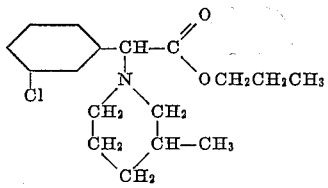

29.5 g. of n-propyl m-chlorophenyl bromoacetate is added slowly to 22 g. of 3-methylpiperidine dissolved in 75 cc. of isopropanol. After the addition has been completed the mixture is heated for one hour on the steam bath and then the isopropanol removed by distillation. 400 cc. of water is added to the residue, the mixture extracted with ether and the ether extract dried. The ether is evaporated and the residue distilled under reduced pressure to obtain the desired n-propyl m-chlorophenyl-(3-methylpiperidino)-acetate.

*Example 13.—Ethyl phenylpyrrolidinoacetate*

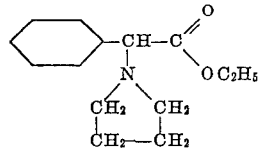

12.15 g. of ethyl phenyl bromoacetate in a small amount of absolute ethanol is added slowly to 10 g. of pyrrolidine dissolved in 50 cc. of absolute ethanol and the resulting mixture heated on a steam bath for about one hour. The ethanol is removed by distillation, 350 cc. of water added to the residue and the mixture extracted with ether. The ether extract is dried, the ether distilled and the residue distilled in vacuo to obtain the desired ethyl phenylpyrrolidinoacetate.

*Example 14.—Isopropyl 3,4-dimethylphenyl-(2',5'-dimethylpyrrolidino) acetate*

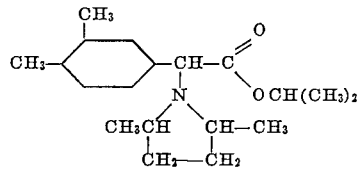

28.4 g. of isopropyl 3,4-dimethylphenyl bromoacetate in 30 cc. of isopropanol is added slowly to 22 g. of 2,5-dimethylpyrrolidine dissolved in 50 cc. of isopropanol. After the addition has been completed, the mixture is heated for one hour on a steam bath and then the isopropanol removed by distillation. 400 cc. of water is added to the residue and the mixture extracted with ether. The ether extracts are extracted with dilute hydrochloric acid, the aqueous extracts treated with decolorizing charcoal, filtered and the filtrate made alkaline with dilute sodium hydroxide solution. The solution is extracted with ether, the ether extracts decolorized with activated charcoal, filtered and the ether evaporated from the filtrate to obtain the desired isopropyl 3,4-dimethylphenyl-(2',5'-dimethyl-pyrrolidino)acetate.

*Example 15.—Benzyl 2-methyl-5-bromophenyl-(4'-ethylpiperidino) acetate*

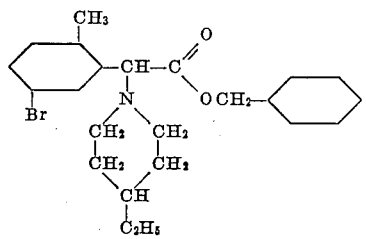

A solution of 19.9 g. of benzyl 2-methyl-5-bromophenyl bromoacetate in 25 cc. of isopropanol is added slowly to a solution of 13 g. of 4-ethylpiperidine in 50 cc. of isopropanol and the resulting mixture heated on a steam bath for one hour. The isopropanol is removed by distillation and the residue taken up in 400 cc. of water and extracted with ether. The ether extract is extracted with dilute hydrochloric acid, the aqueous extract decolorized with activated charcoal and filtered. The filtrate is made alkaline with dilute sodium hydroxide solution and extracted with ether. The ether extracts are combined, treated with decolorizing charcoal, filtered and the ether evaporated from the filtrate to the desired benzyl 2-methyl-5-bromophenyl-(4'-ethylpiperidino) acetate.

Some further examples of the new phenyl acetic acid esters which can be prepared by the above methods are:

1. Isopropyl 4-chlorophenyl morpholinoacetate.
2. Benzyl phenyl-(3-ethylmorpholino) acetate.
3. n-Propyl 3-ethylphenyl-(2'-methyltetrahydroquinolino) acetate.
4. Methyl 3 - methoxy - 4 - methylphenyl - (2'-methylmorpholino) acetate.
5. Sec. butyl 3,5-dichlorophenyl piperidinoacetate.
6. Phenethyl 4-ethoxyphenyl pyrrolidinoacetate.
7. Ethyl 2-chlorophenyl piperidinoacetate.
8. Ethyl 3,4-dichlorophenyl piperidinoacetate.
9. Ethyl 4-methoxyphenyl piperidinoacetate.
10. Ethyl 3-methylphenyl piperidinoacetate.

What I claim is:

1. A phenyl aminoacetic acid ester compound of the class consisting of a free base and its acid addition salts, said free base having the formula,

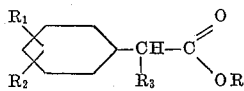

where R is a member of the class consisting of lower alkyl and phenalkyl radicals, $R_1$ and $R_2$ are members of the class consisting of hydrogen, halogen, alkyl and alkoxy radicals and $R_3$ is a member of the class consisting of piperidino, morpholino, pyrrolidino, tetrahydroquinolino, and lower alkylated derivatives thereof.

2. A phenyl aminoacetic acid ester compound of the class consisting of a free base and its acid addition salts, said free base having the formula,

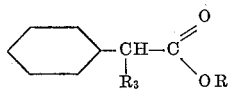

where R is a lower alkyl radical and $R_3$ is a piperidino radical.

3. A phenyl aminoacetic acid ester compound of the class consisting of a free base and its acid addition salts, said free base having the formula,

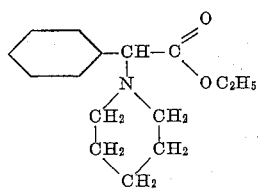

4. The hydrochloride salt of ethyl phenyl piperidinoacetate having the formula,

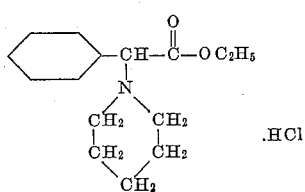

5. A phenyl aminoacetic acid ester compound of the class consisting of a free base and its acid addition salts, said free base having the formula,

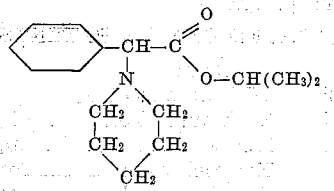

6. The hydrochloride salt of isopropyl phenyl piperidinoacetate having the formula,

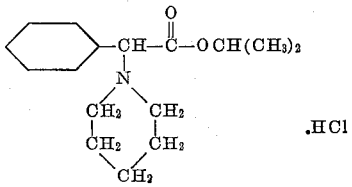

7. A phenyl aminoacetic acid ester compound of the class consisting of a free base and its acid addition salts, said free base having the formula,

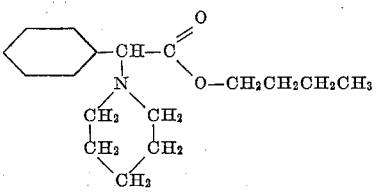

8. n-Butyl phenyl piperidinoacetate having the formula,

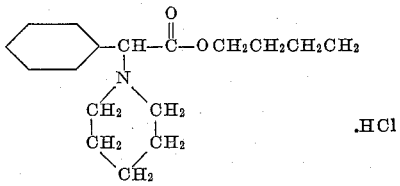

9. In a process for obtaining a phenyl aminoacetic acid ester of formula,

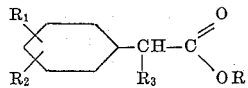

the step which comprises reacting a phenyl haloacetic acid ester of formula,

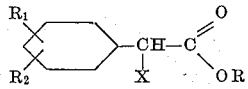

with at least two mols of a heterocyclic nitrogen compound of the class consisting of piperidine, morpholine, pyrrolidine, tetrahydroquinoline and lower alkylated derivatives thereof, where R is a member of the class consisting of lower alkyl and phenalkyl radicals, $R_1$ and $R_2$ are members of the class consisting of hydrogen, halogen, alkyl and alkoxy radicals, $R_3$ is a member of the class consisting of piperidino, morpholino, pyrrolidino, tetrahydroquinolino, and lower alkylated derivatives thereof, and X is a halogen atom of the class consisting of chlorine and bromine atoms.

GEORGE RIEVESCHL, JR.

(References on following page)

REFERENCES CITED

The following references are of record in the file of this patent:

UNITED STATES PATENTS

| Number | Name | Date |
|---|---|---|
| 2,240,275 | Whitmore et al. | Apr. 29, 1941 |
| 2,230,774 | Bockmuhl et al. | Feb. 4, 1941 |
| 2,293,034 | Moore | Aug. 18, 1942 |
| 2,356,587 | Heutrich et al. | Aug. 22, 1944 |
| 2,387,447 | Hoffman et al. | Oct. 23, 1945 |
| 2,428,253 | von Werder | Sept. 30, 1947 |
| 2,441,130 | Bernstein et al. | May 11, 1948 |
| 2,442,865 | Smith | June 8, 1948 |
| 2,447,395 | Cheney et al. | Aug. 17, 1948 |

FOREIGN PATENTS

| Number | Country | Date |
|---|---|---|
| 671,786 | Germany | Feb. 13, 1939 |

OTHER REFERENCES

Karrer et al., Chem. Abstracts, vol. 18 (1924), pp. 816 and 817.

Drake et al., Chem. Abstracts, vol. 28 (1934), pp. 2715 and 2716.